INVENTORS A. H. BOBECK
J. L. SMITH
BY Herbert M. Shapiro
ATTORNEY

Nov. 18, 1969 A. H. BOBECK ET AL 3,479,654

DOMAIN PROPAGATION MEDIA ORGANIZED FOR REPERTORY DIALER OPERATION

Filed May 16, 1966 7 Sheets-Sheet 7

United States Patent Office 3,479,654
Patented Nov. 18, 1969

3,479,654

DOMAIN PROPAGATION MEDIA ORGANIZED FOR REPERTORY DIALER OPERATION

Andrew H. Bobeck, Chatham, and James L. Smith, Bedminster, N.J., assignors to Bell Telephone Laboratories, Incorporated, Murray Hill and Berkeley Heights, N.J., a corporation of New York Filed May 16, 1966, Ser. No. 550,389
Int. Cl. G11b 5/62
U.S. Cl. 340—174 12 Claims

ABSTRACT OF THE DISCLOSURE

Domain propagation media are organized, for repertory dialer operation, to effect writing of like information into an input area of each medium responsive to each input signal. The information so stored is subsequently moved into a storage area associated with an input area in only a selected medium. Any subsequent write or read operation clears all the input areas of spurious information. The arrangement reduces accessing requirements making the organization attractive for small memories.

This invention relates to data storage and retrieval systems and, more particularly, to such systems employing magnetic media.

Information is stored in and retrieved from memory matrices in response to select pulses applied to coordinate conductors associated with a selected bit location. Characteristic of such memories is the "half-selection" of all bit locations associated with each of the coordinate conductors. Such half-selection results in a disturbance of those bit locations to produce noise signals which are particularly detrimental during sense (retrieval) operations. In addition, when such memories are arranged in a word-organized manner, a sense conductor and amplifier are required for each bit in a word. Sense amplifiers are costly, however, and it is desirable to keep the number of such amplifiers to a minimum.

An object of this invention is to provide a word-organized type memory having little access noise and having a common sense conductor and amplifier.

The inventon is based on the realization that information stored in a memory may be "selected" by moving selected information through the memory rather than by "interrogating" in the usual manner.

More specifically, the foregoing and further objects of this invention are realized in one embodiment thereof wherein a memory comprises a plurality of magnetic domain wall wires. For reference, a magnetic domain wall wire comprises a magnetic material in which a reverse magnetized domain is provided in response to a first field in excess of a nucleation threshold and through which reverse domains are advanced in response to a second field in excess of a propagation threshold and less than the nucleation threshold. In operation, reverse domains are usually provided by first fields generated in an input portion of the wire and are advanced to a remote output position by second fields applied over consecutive limited portions of the wire.

The domain wall wires, in accordance with this invention, are coupled by a common sense conductor at centrally disposed output positions therealong dividing each wire into write and storage portions. Information is written into the write portion of all wires simultaneously but advanced to the corresponding storage portion only on a selected wire. Information is retrieved from (read out of) such a memory by moving stored information from the storage portion of a selected wire to the corresponding write portion and, then, by returning that information to the storage portion past the sense conductor providing output signals in that conductor.

Accordingly, a feature of this invention is a memory including a plurality of propagation media and means for writing information simultaneously into all of the media.

Another feature of this invention is a memory including a plurality of propagation media, means for writing information simultaneously into all of the media, and means for moving information in first and second directions along a selected medium.

A further feature of this invention is a memory including a plurality of propagation media, means for writing information into all of the media simultaneously, means for moving information in a selected medium, and common sense means coupled to each of the media for selectively detecting the movement of information in a first direction.

The invention permits the dissociation of the selection mechanism and the sensing apparatus thus preventing access noise from being reflected in the output. Importantly, the invention also permits the use of a single sense conductor and amplifier for a word-organized memory. The advantages of such an arrangement, thus, are low noise characteristics and low cost. Moreover, the arrangements have been found particularly well suited to many telephone operations as, for example, repertory dialers in terms of which this invention is illustratively disclosed.

The foregoing and further objects and features of this invention will be understood more fully from the following detailed discussion rendered in conjunction with the accompanying drawing in which:

FIG. 1 is a schematic representation of a repertory dialer in accordance with this invention;

FIGS. 2, 3, 4, and 5 are schematic illustrations of portions of the repertory dialer of FIG. 1 showing the disposition of information therein during operation;

Figure 1:
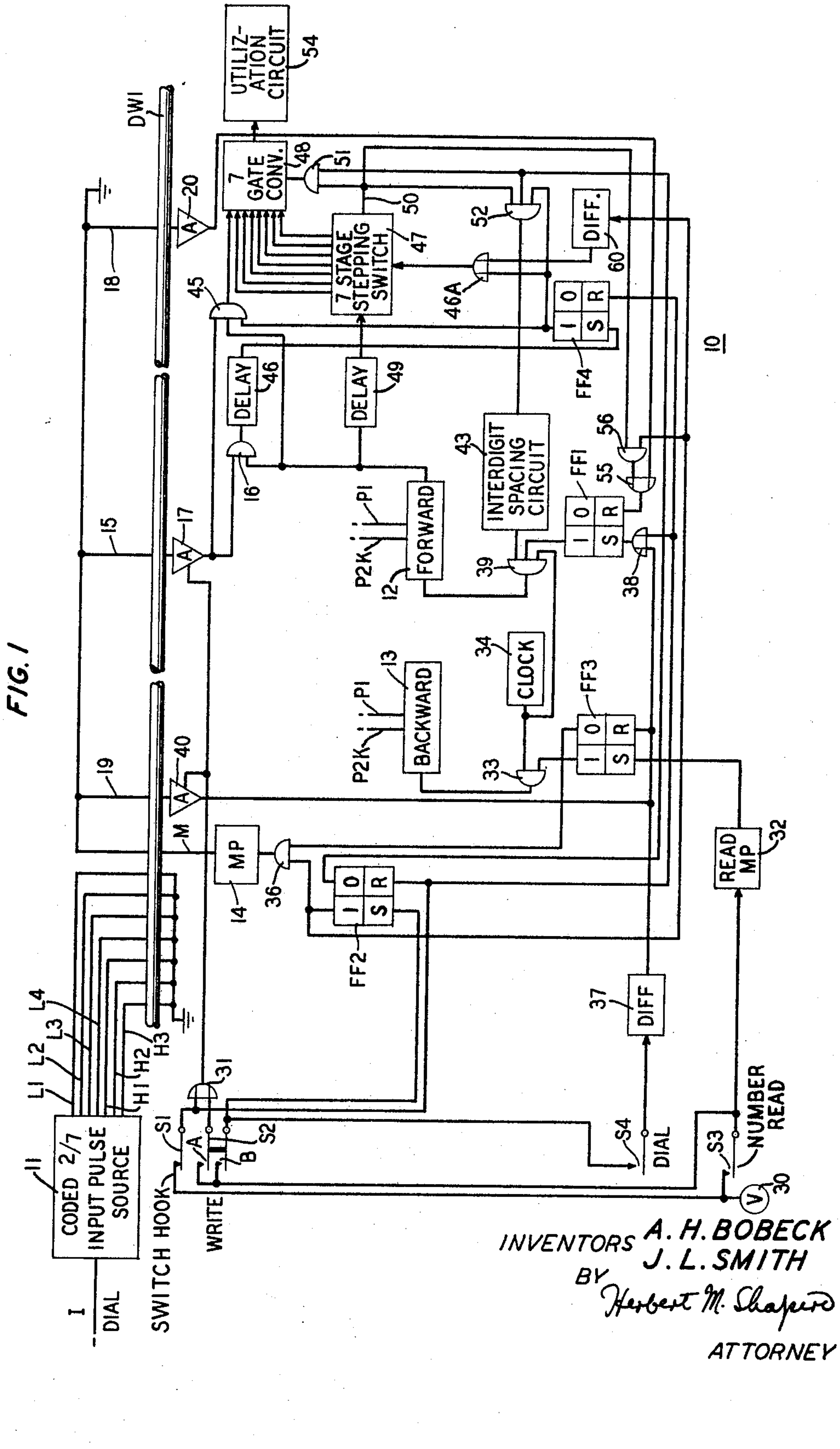

Specifically, FIG. 1 shows a repertory dialer 10 in accordance with this invention. A repertory dialer, as is well known, functions to store and automatically dial telephone numbers in response to coded signals under the control of a subscriber. The subscriber subset is not shown herein but is indicated generally by a block designated "coded 2/7 input pulse source" 11 and, more specifically, an input I thereto. Suitable inputs may be generated, for example, with signals from the "dial" of a pushbutton type subset as is well known.

Figure 2:
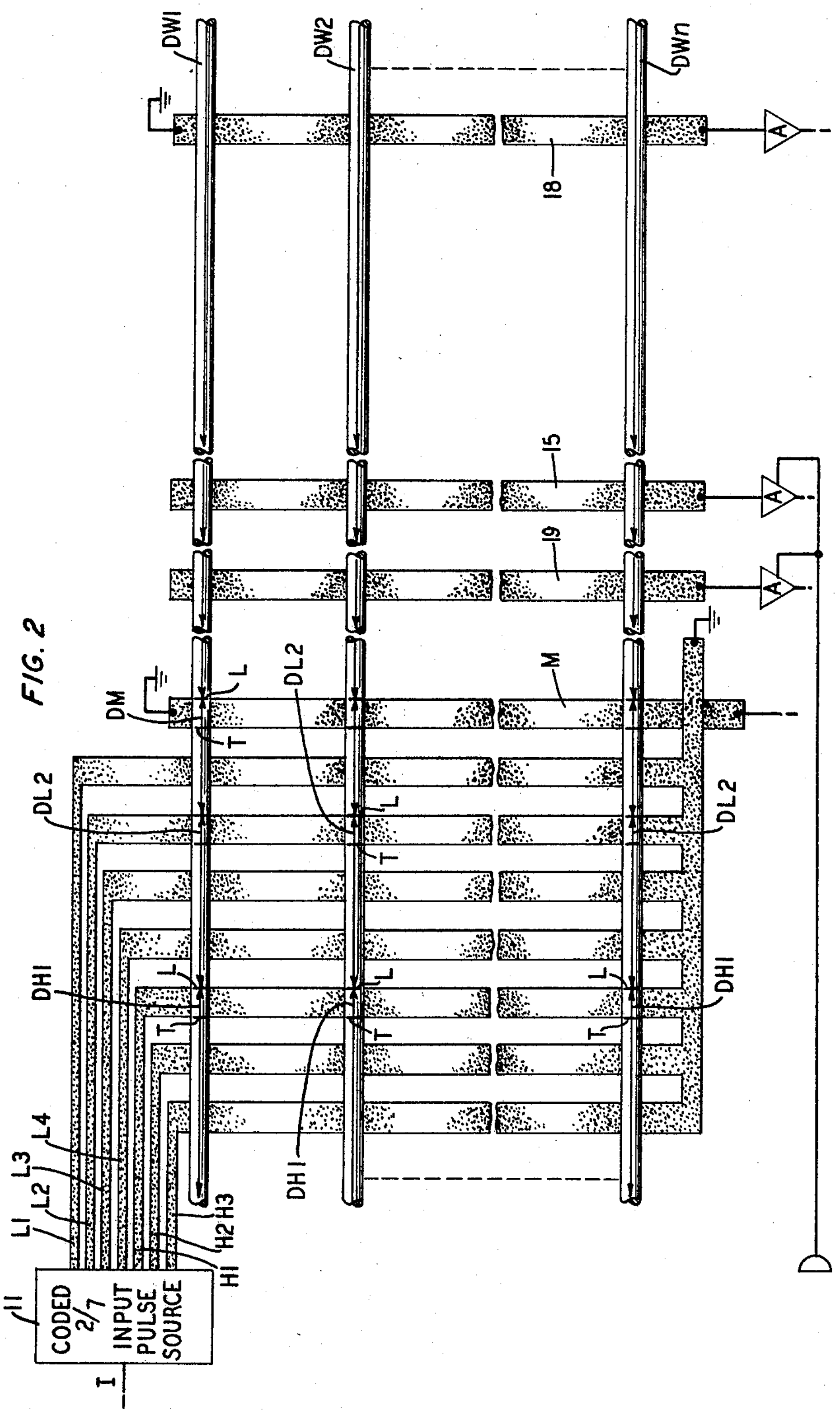

The dialer 10 includes a magnetic domain wall wire DW*k* for each telephone number stored. Only one domain wall wire DW1 is shown in FIG. 1. Others are shown in FIG. 2. Illustratively, seven conductors couple all the domain wall wires and are connected between pulse source 11 and ground. The seven conductors are designated L1, L2, L3, L4, H1, H2, and H3 to correspond to the accepted designations for the (low and high) multifrequencies associated with the TOUCH-TONE subset as will become clear hereinafter. The depression of a digit-select button in the conventional pushbutton array (dial) at a subscriber subset corresponds to the activation of a coded pair of the seven conductors. Of course, subsets of the type useful in accordance with this invention conveniently include apparatus for visually representing a plurality of frequently dialed telephone numbers with corresponding buttons of a second set of buttons designated. Such an apparatus is known and its use herein is supplementary to and not a part of this invention as would be apparent to one skilled in the art. On the other hand, those second buttons, herein termed "number-select" buttons, are very much a part of this invention to the extent that the depression of one such button determines which one of domain wall wires DW$k$ is selected for the movement of information. We will have occasion to describe the operation in response to the depression of a number-select button hereinafter. At this juncture it should be made clear that the seven conductors L1 . . . L4, H1 . . . H3 are the input (write) conductors to the repertory dialer. Those conductors couple all of the domain wall wires and effect like reverse domain patterns (information words) in each of those wires when pulsed in coded pairs by pulse source 11 in response to the depression of a digit-select button by a subscriber.

It is important for a complete understanding of this invention that the representation and movement of information in a domain wall wire be fully understood. Accordingly, a brief description of such a representation and movement as adapted in accordance with this invention is provided now. Specifically, information is stored in a domain wall wire as reverse domains. For example, FIG. 2 shows reverse domains as arrows directed to the right as viewed and bounded by leading and trailing domain walls represented by vertical lines designated L and T, respectively. The wire is assumed initialized to a magnetic condition represented by arrows directed to the left. The domain walls, then, are defined by the interface between a reverse domain and adjacent initialized portions. The domains are designated by a D followed by the designation of the one of the seven conductors pulsed for initially generating the domain. Thus the pulsing of conductors L2 and H1 in response to the depression of a digit-select button provides domains DL2 and DH1, respectively. The coded disposition of those domains is shown in FIG. 2.

Figure 3:
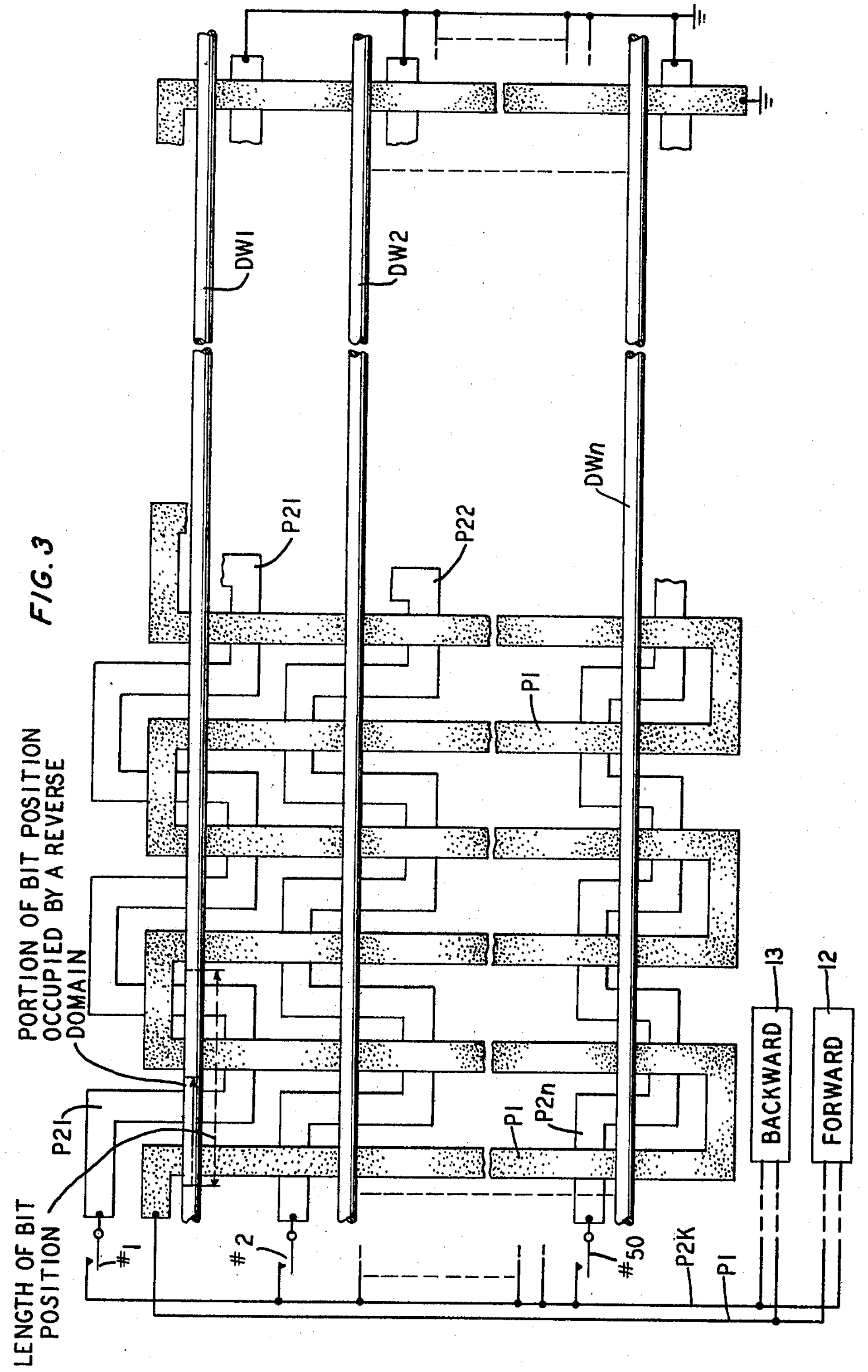

Reverse domains are moved through domain wall wires in a manner which preserves the separation between domains. Basically, the movement is as described in K. D. Broadbent, Patent No. 2,919,432, issued Dec. 29, 1959. FIG. 3 shows the propagation mechanism for so moving those reverse domains in accordance with this invention. The mechanism comprises a conductor P1 which couples all of the domain wall wires and, in addition, conductors P2$k$ each of which couples a different correspondingly numbered domain wall wire. For example, conductor P21 couples domain wall wire DW1, conductor P22 couples domain wall wire DW2, and (for $k=n$) conductor P2$n$ couples wire DW$n$. The conductors interleave in a well known manner. FIG. 3 also shows a plurality of switches, illustratively fifty, designated #1 to #50. Those switches are under the control of the number-select buttons mentioned above. Thus, the depression of any one of those buttons closes a corresponding switch. Only one such button may be depressed at a time, any previously depressed button being released, by means not shown, when a next button is depressed. The conductor P1 is connected between a propagation pulse source shown in FIG. 1 as two blocks 12 and 13 labeled "forward" and "backward," respectively, and ground. Similarly, all the conductors P2$k$ are connected between the propagation pulse source, via the corresponding switches, and ground. The pulse source provides the now well known four-phase propagation pulse sequence, +P1, +P2$k$, −P1, −P2$k$, where the particular P2k conductor is determined by the number-select button depressed. In this manner information initially stored in all the domain wall wires is advanced selectively along only one wire.

The propagation pulse source is represented as two blocks in FIG. 1 to show that two separate pulse sources may be used for forward and backward movement of reverse domains. In practice, it is convenient to use a single source and to alter the pulse sequence to provide the forward and backward movement. The propagation pulses, in either case, are applied to the same propagation conductors and those conductors, thus, are shown connected to each of blocks 12 and 13 in FIG. 1. Next adjacent reverse domains in a domain wall wire are positioned four pulses (one propagation sequence or bit position) apart.

The domains DL2 and DH1, shown in FIG. 2, are provided in response to the depression of a digit-select button. Accordingly, those domains correspond to a decimal digit of a telephone number. A telephone number, then, is stored as a plurality of coded domain pairs, each pair being stored, simultaneously, in all the domain wall wires as described and moved to the right, as viewed, in only a selected wire each time a digit is stored.

The representation of the first digit of a telephone number in accordance with this invention is preceded by a "marker" reverse domain DM as shown in FIG. 2. A conductor M is coupled to all the domain wall wires, as shown in FIG. 2, to this end. The conductor is connected between a monopulser 14, shown in FIG. 1, and ground, and is positioned, conveniently, one bit position removed from the position of the nearest one of the seven coded conductors. The control circuitry for pulsing conductor M will be described hereinafter. A telephone number, then, is stored as a succession of coded reverse domain pairs preceded by a marker domain. Each coded pair is advanced seven positions in a selected domain wall wire as soon as it is stored to provide room for the representation of the next succeeding digit there. The control circuitry for so advancing the reverse domains is described hereinafter also.

Figure 4:
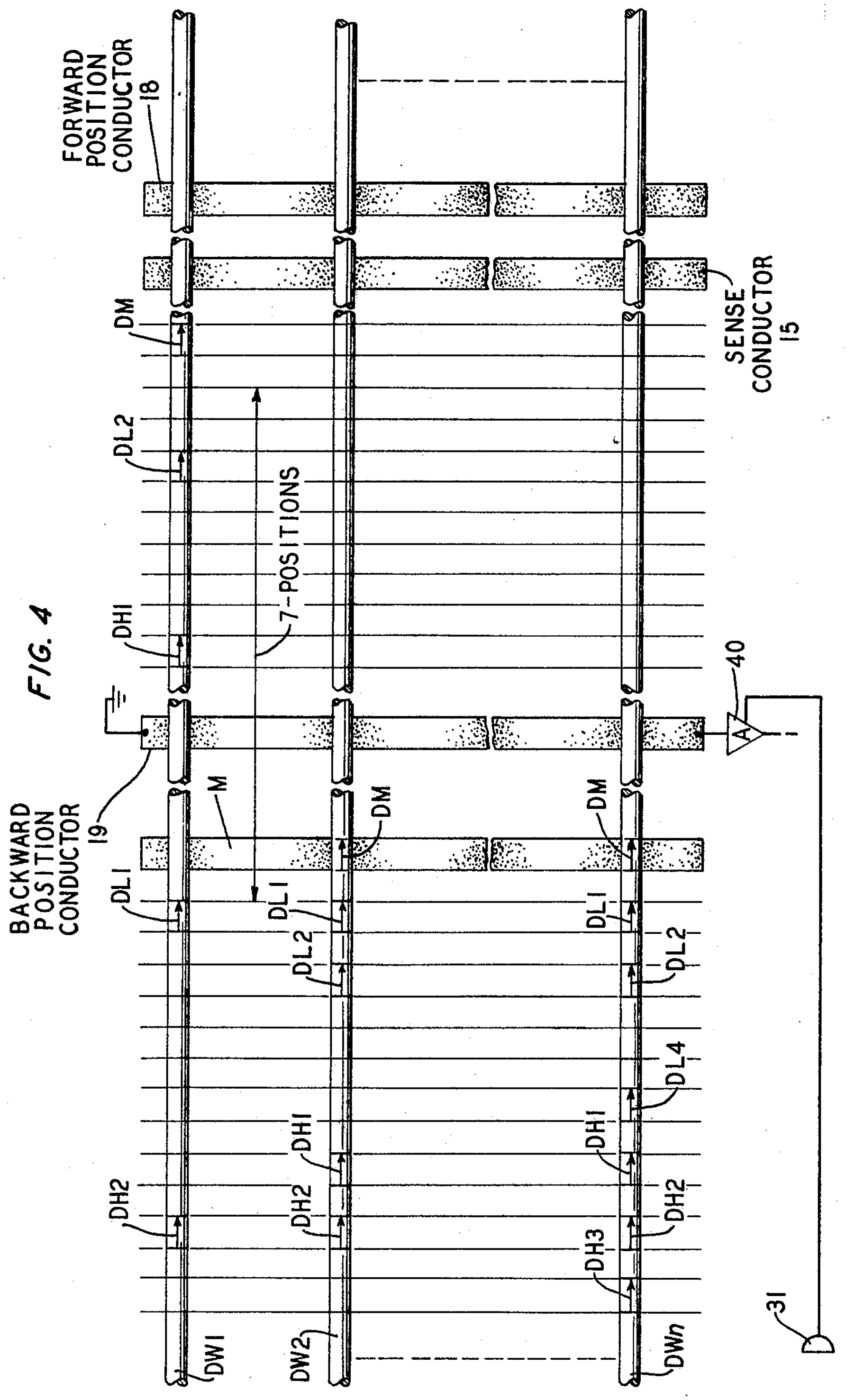

FIG. 4 shows the domains DL2 and DH1 and the marker domain DM advanced seven positions, as described, along a selected domain wall wire DW1. Those domains do not move along nonselected domain wall wires and next succeeding domains are written into all the wires regardless of the presence of domains from a preceding digit wire operation. For example, if a second digit corresponding to pulses in conductors L1 and H2 is stored, the corresponding domains DL1 and DH2 are written into a cleared portion of wire DW1 but are written into an uncleared portion of the remaining wires. The magnetic condition of all domain wall wires except the selected domain wall wire is shown in the representation of wire DW2 in FIG. 4. Importantly, information is moved only along the selected wire (DW1).

Figure 5:
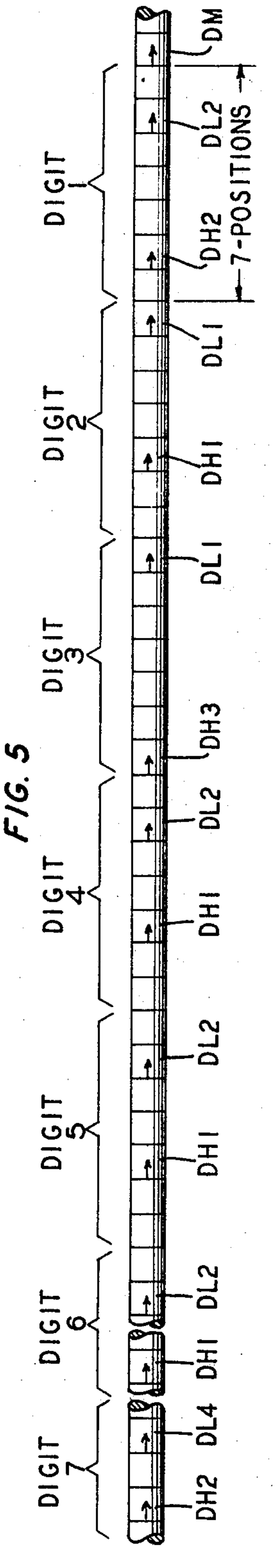

Information is stored in a selected wire as described in response to each depression of a digit-select button. Consider a representative local telephone number "dialed" and stored in this manner. Selected wire DW1, then, includes an assumed pattern of reverse domains DM, DL2–DH2, DL1–DH1, DL1–DH3, DL2–DH1, DL2–DH1, DL2–DH1, and DL4–DH2, reading from right to left as shown in FIG. 5. Such a pattern of reverse domains will be shown to correspond to the telephone number 5134440 in connection with a description of a pushbutton dial shown in FIG. 6. All the nonselected domain wall wires include domains DL1, DL2, DL4, DH1, DH2, and DH3 as shown in the representation of wire DW$n$ in FIG. 4, assuming the repertory dialer of FIG. 1 is blank when the present operation is initiated.

The pattern of domains shown in FIG. 5 is positioned in wire DW1 between the marker conductor M and a sense conductor 15 in the foregoing manner. In practice, conductors M and 15 are positioned illustratively far enough apart to provide storage for sixteen digits therebetween. Sixteen digits correspond to the assumed present maximum length for telephone numbers. The sense conductor 15 is connected between an AND circuit 16, via an amplifier 17, and ground as shown in FIG. 1.

When a complete telephone number is stored, the reverse domains are advanced to the right, as viewed, seven positions at a time until the marker domain DM reaches a forward position conductor 18. Conductor 18 is connected between an amplifier 20 and ground as shown in FIG. 1. That conductor operates in response to the arrival of the marker domain there to terminate the advance of information through the selected wire in a manner to be described hereinafter. Information is thus advanced past the sense conductor to what may be termed a storage portion of the selected wire. The sense conductor 15 may be considered to divide each domain wall wire into write and storage portions to the left and right thereof as viewed in FIG. 2.

A write operation in accordance with this invention then may be summarized generally by the following steps. First, consecutive patterns of reverse domain pairs are stored in a write portion of all wires in the memory. Each pair of domains is advanced (to the right as viewed) a number of positions to clear the initial storage section of the write portion of only a selected wire. The storage and advance of each domain pair is in response to the depression of a digit-select button in, for example, the push-button subset. A particular wire is selected for the storage and advance of information in response to the depression of a number-select button. The information is advanced seven positions after the storage of each domain pair in a manner to be described in detail hereinafter. A completely stored number is moved to the right, in increments of seven positions, until a marker domain preceding the stored number passes a predetermined forward position at which point information advance ceases and information is properly positioned in a storage portion of a selected wire.

The readout of a number so stored is now described generally; then the specific circuitry for implementing the write and read operations is described in detail in connection with FIG. 1. Thereafter, a specific illustrative operation for a representative telephone number is described.

Following the above format, we may consider, in general, the readout of information stored in the selected wire DW1. Initially, the sense conductor 15 is inhibited when information is first moved from a write portion to a storage portion of a selected wire in order to avoid providing outputs during such movement. This operation will become clearer hereinafter. The sense conductor, however, normally responds to information moving from left to right as viewed in FIG. 1, a pulse being induced therein each time a reverse domain passes that conductor. Consequently, to read stored information, information is moved from a storage position of a selected wire to the corresponding write position. Movement of information during this operation then is from right to left in a selected wire as viewed in FIG. 1. A backward position conductor 19 responds to the arrival of a reverse domain there during a read operation to terminate the movement of information to the left. Information thereafter is stepped from left to right past the sense conductor 15 inducing a sequence of pulses therein. Those pulses control a converter for providing a coded two-out-of-seven (2/7) parallel output in a manner to be fully described hereinafter.

If we consider the telephone number stored as the sequence of reverse domain patterns shown in FIG. 5, we see that information is written in initially as described and advanced in increments of seven positions to the right until the domain DM reaches the forward position conductor 18. During a read operation, that information is moved to the left until domain DH2, at the left as viewed in FIG. 5, reaches the backward position conductor 19 and then is moved to the right until the domain DM is again at the forward position conductor 18. The readout operation is nondestructive.

Now that we have the write and read functions of the circuit of FIG. 1 clearly in mind, we are in a position to consider the implementing circuitry. That circuitry is described in connected with FIG. 1 in terms of blocks of circuitry implementing various functions and the subscribed action upon the circuitry for properly interleaving the various functions and for providing compatible outputs to a central office.

Specifically in connection with FIG. 1, a plurality of switches are shown to the left as viewed. The circuit of FIG. 1 provides read or write operations in accordance with this invention in response to the depression of number-select and digit-select buttons on a subscriber subset (not shown) as has been indicated hereinbefore and, in addition, in response to the depression of an additional "write" button. Those bottons control the switches shown in FIG. 1 (and FIG. 3) and, accordingly, the operation of the switches is described herein as initiating the various movements of information.

A "switch hook" switch S1, shown in FIG. 1, is connected between a voltage source 30 and an input to an OR circuit 31. Switch S1 is normally closed and is opened automatically when the subscriber goes off-hook. A "write" switch S2, including first and second armatures and wipers for closing and opening the switch at two contacts A and B, is also shown in FIG. 1. The switch S2 is connected via contact A between an input of OR circuit 31 and voltage source 30. The switch is connected, via contact B, between a set input of a flip-flop FF2 and voltage source 30. Connection to the voltage source 30 is by means of a normally open number-read switch S3 to be described. Switch S2 is normally open but is closed in response to the depression of a write button (not shown) in the subscriber subset.

FIG. 1 also shows a "number-read" switch S3 connected between voltage source 30 and the input to a read monopulser 32. The number-read switch S3 is normally open and is closed in response to the depression of any number-select button (not shown) on a subscriber subset.

The output of read monopulser 32 is connected to the set input of a flip-flop FF3. The set output of flip-flop FF3 is connected to an input of an AND circuit 33. A clock pulse source 34 is connected to another input of AND circuit 33 and the output of AND circuit 33 is connected to backward pulse source 13, AND circuit 33 acting to gate clock pulses to the latter when enabled by means of flip-flop FF3.

When the subscriber goes off-hook, switch S1 is opened and a voltage applied from source 30 for activating OR circuit 31 is terminated. For a read operation, the subscriber next depresses a number-select button closing a selected switch of FIG. 3 and the number-read switch S3 of FIG. 1. In response, a corresponding propagation conductor P2*k* is connected to the propagation pulse source (12 or 13) and the voltage from source 30 is applied, via the number-read switch S3, to read monopulser 32. The read monopulser 32 sets flip-flop FF3 thus enabling AND circuit 33. Each clock pulse from source 34, thus, initiates the backward pulse source 13 for applying a propagation pulse sequence, consecutive clock pulses thus effecting the movement of information (backward) from a storage portion to a write portion of a selected wire as described hereinbefore.

FIG. 3 shows the select switches for selecting a particular propagation conductor P2*k*. If the (number-select) switch #1 corresponding to the telephone number in domain wall wire DW1 is selected, then propagation conductor P21 is connected via the switch #1 and the pulses from backward pulse source 13 are applied, consequently, to conductors P21 and P1 in a manner to propagate stored information to the left in wire DW1 as viewed in FIG. 3.

For a write operation, the subscriber closes write switch S2 before closing the number-read switch S3. In this manner when the number-read switch S3 is closed, the voltage from source 30 is applied, via contacts A and B of switch S2, to OR circuit 31 and to the set input of flip-flop FF2, respectively. The set output of flip-flop FF2 is connected to an input of an AND circuit 36. The output of AND circuit 36, in turn, is connected to monopulser 14 for controlling the pulses applied to conductor M for providing marker domains in the domain wall wires when AND circuit 36 is enabled.

An additional switch S4 labeled the "dial" switch in FIG. 1 is connected between write switch S2, via the contact B, and the reset input of flip-flop FF3. The connection to flip-flop FF3 is effected by means of a differentiator 37.

When dial switch S4 is closed, responsive to the depression of a digit-select button, the change in voltage there is detected by differentiator 37 which responds by resetting flip-flop FF3. The resetting terminates backward movement of information as will become clear, enabling a pair of coded domains to be stored in the selected domain wall wire. The reset output of flip-flop FF3 is connected to an input of AND circuit 36. When flip-flop FF3 is reset, then, AND circuit 36 is enabled and a marker domain is provided in each domain wall wire. Dial switch S4 also is connected to an input of an OR circuit 38. The output of OR circuit 38 is connected to the set input of a flip-flop FF1. The set output of flip-flop FF1, in turn, is connected to an input of an AND circuit 39; clock source 34 is connected to another. The output of AND circuit 39 is connected to forward pulse source 12. When switch S4 is again opened, the opposite change in voltage activates OR circuit 38 for setting flip-flop FF1. To this end, an inverter (not shown) is conveniently included for controlling the polarity of the input to OR circuit 38. The setting of flip-flop FF1 initiates forward movement of information. The dial switch S4 is closed and opened each time a digit-select button is depressed.

The operation in terms of the aforedescribed implementing circuitry is relatively easy to understand if the read operation is described prior to the description of the write operation.

The subscriber action for reading a telephone number from a selected wire in accordance with this invention is, specifically, to go off-hook, and depress a number-select button, for example, that which corresponds to the switch #1 of FIG. 3, closing the number-read switch S3. In response to this subscriber action, the following change occurs in the condition of the circuit of FIG. 1. The number-select switch #1 connects the propagation conductor of the selected domain wall wire to the propagation pulse source (12 or 13). The closure of the number-read switch S3 triggers the read monopulser 32 which provides a delay to allow contact chatter to subside before starting the operation. Read monopulser 32 sets flip-flop FF3 which in turn gates clock pulses from clock 34 to trigger backward pulse source 13 for applying four-phase pulse sequences to conductors P1 and P21.

Information is spaced backward until a revere domain arrives at the backward position conductor 19 inducing a bipolar pulse pair therein. To this end, conductor 19 is positioned to correspond to the second phase of a four-phase propagation sequence to insure passage thereby of a forward and a trailing domain wall. The pulses are amplified by an amplifier 40. Amplifier 40 (FIG. 1) is connected to the reset input of flip-flop FF3. The first of the amplified pulses, then, serves to reset flip-flop FF3 terminating the backward movement of information when a reverse domain passes, from right to left, past backward position conductor 19. Amplifier 40 is also connected to an input of OR circuit 38 (via an inverter not shown). Thus when the second (opposite polarity) pulse is induced in backward position conductor 19 during a read operation, OR circuit 38 is activated. Since the output of OR circuit 38 is connected to the set input of flip-flop FF1, the latter is set thus enabling AND circuit 39. The enabled AND circuit gates pulses from clock 34 for triggering four-phase propagation pulses from forward pulse source 12. In this manner, information is again stepped left to right in the selected wire DW1 as viewed in FIG. 3. The enabling of AND circuit 39 requires an output from an interdigit spacing circuit 43. Note, an output of circuit 43 is connected to an input of AND circuit 39. For now this output is assumed present. The interdigit spacing circuit 43 and its further operation are more appropriately discussed in connection with the output of the circuit of FIG. 1 hereinafter.

Information continues to move to the right until a marker domain arrives at sense conductor 15. Sense conductor 15 is connected, via amplifier 17, to an input of AND circuit 16 and the input of an AND circuit 45. Forward pulse source 12 is also connected to an input of each of AND circuits 16 and 45. The output of AND circuit 16 is connected, via a four-phase delay 46, to the set input of a flip-flop FF4. When the marker domain arrives at sense conductor 15, then, it induces a pulse therein for activating (concurrently enabled) AND circuit 16 for setting flip-flop FF4.

The set output of flip-flop FF4 is connected to an input of an OR circuit 46A, the output of which is connected to an input of a seven-stage stepping switch 47. The set output of flip-flop FF4 is also connected to an input of OR circuit 45, the output of which is connected to a seven-gate converter 48 used to convert sequential pulses flip-flop FF4 is set in response to the marker domain arriving at sense conductor 15, the seven-stage stepping switch 47 is reset after a four-phase delay and the first gate of the seven-gate converter 48 is set (after a one-phase delay). The four-phase delay avoids an output due to the marker domain.

The next four-phase propagation sequence advances the first bit of information past the sense conductor 15. A glance of FIG. 5 shows that the first digit there is represented by domains DL2 and DH2. A reverse domain in the "position" advanced past the sense conductor at this time would be designated DL1 if present. No such domain is present however. Therefore, no domain passes sense conductor 15 at this time, no pulse is induced therein, and the first position of the seven-gate converter stores a binary zero (corresponding to the absence of a reverse domain).

The forward pulse source 12 is also connected to stepping switch 47 via a delay 49. When source 12 provides a four-phase pulse sequence, it pulses (on the fourth phase) stepping switch 47 which in response is advanced one position after a one-phase delay (49) corresponding to the duration of a propagation pulse. The position corresponding to the second gate of the seven-gate converter is readied to receive information. The next four-phase propagation sequence advances the domain DL2 of FIG. 5, for example, past the sense conductor 15. Consequently, a binary one (corresponding to the presence of a reverse domain) is stored in the second position of the converter 48. This process continues until seven bits are stored in the seven positions of the converter 48 at which time stepping switch 47 provides a readout signal to converter 48 activating the latter for providing a parallel readout.

The parallel readout has the form –0100010– for the first digit as shown in FIG. 5. The readout signal enabling that output is provided by stepping switch 47 along a conductor 50 connected to an input of each of AND circuits 51 and 52. The reset output of (write) flip-flop FF2 is connected to another input of each of those AND circuits. The set output of flip-flop FF4, in addition, is connected to an input of AND circuit 52. The flip-flops FF2 and FF4 are in the reset and set conditons, respectively, at this time. Accordingly, both AND circuits 51 and 52 are enabled. The readout signal consequently activates AND circuit 51 for signaling converter 48 for parallel readout and, as well, activates AND circuit 52. The output of AND circuit 52 is connected to the input to interdigit spacing circuit 43. As was mentioned hereinbefore, interdigit spacing circuit 43 normally provides a voltage level for enabling AND circuit 39. When AND circuit 52 is activated by the readout signal from stepping switch 47, interdigit spacing circuit 43 provides a null for a predetermined time. The interdigit spacing circuit may comprise a monopulser to this end.

During a read operation, then, information for example as shown in FIG. 5 is stepped left to right past sense conductor 15 providing a sequential indication of the positions of reverse domains in the seven-gate converter 48. Each time a seven-bit indication of the position of reverse domains representing a decimal digit is stored in converter 48, a parallel readout is provided to a utilization circuit 54. The seven position indications of next succeeding digit representations are similarly provided, spaced apart by interdigit spacings as is well known. The utilization circuit may be 2/7 to multifrequency converter for converting the output of converter 48 to a multifrequency form for transmission to a central office.

This readout process continues until the marker domain arrives at the forward position conductor 18. That conductor is connected via amplifier 20 to an input of an OR circuit 55. Thus, OR circuit 55 is activated by a pulse induced in conductor 18 by the marker domain. The output of OR circuit 55 is connected to the reset input of flip-flop FF1. In this manner, then, flip-flop FF1 is reset and the propagation, from left to right, as viewed in FIG. 1, is terminated. A selected number is thus automatically dialed.

Should the subscriber go on-hook before the read operation is completed, flip-flop FF1 is set and flip-flop FF4 is reset. To this end, the set input of flip-flop FF1 (via OR circuit 38) and the reset input of flip-flop FF4 are connected to voltage source 30 via switch S1. Remember switch S1 is closed in the "on-hook" condition. Source 30 is also connected to amplifiers 17 and 40 via switch S1 and OR circuit 31, those amplifiers being inhibited when switch S1 is closed. The depression of a different number-select button is avoided (by means not shown) until information again moves to the right in this instance.

The write operation is now described in terms of the implementing circuitry. Specifically, to change the information in a particular domain wall wire, the write switch S2 of FIG. 1 is closed prior to the closure of the number-read switch (shown in FIG. 3). When the number-read switch S3 is closed, the voltage of source 30 is applied to OR circuit 31 via switch S2 (contact A) and the output of that circuit inhibits amplifiers 40 and 17. Also, when the number-read switch is closed, the voltage of source 30 is applied via contact B of write switch S2 to set flip-flop FF2 for enabling AND circuit 36. The set output of flip-flop FF2 is connected to an input of an AND circuit 56 and an input of OR circuit 46A (via a differentiator 60). Therefore, when flip-flop FF2 is set, AND circuit 56 is enabled and seven-stage stepping switch 47 is reset. The system is now in a condition to respond to input codes at I to store corresponding information on a selected wire in place of that information previously stored.

At the time flip-flop FF2 is set, read monopulser is triggered, via number-read switch S3. In turn, backward pulse source 13 is activated for pulsing propagation conductors P1 and P21 for moving information backward. The amplifier 40 connected to the backward position conductor 19 is inhibited at this time. Thus, movement backward is not terminated when a reverse domain arrives at conductor 19. Instead, the information stored in the selected wire, wire DW1, is backed off the wire and the entire selected wire is thus cleared.

Next, consecutive digit-select buttons are depressed by the subscriber for storing the desired number backward propagation terminating when the first digit-select button is depressed in a manner to be described. In response, consecutive reverse domain pairs are stored via pulse source 11 and conductors L1, L2, L3, L4, H1, H2, and H3 as described. The dial switch S4 (FIG. 1) is closed and released each time a digit-select button is depressed for storing a digit of the desired telephone number. The write switch S2 is still closed. Thus closure of the dial switch, in response to the depression of the first digit-select button resets flip-flop FF3, via differentiator 37, thus terminating the backward movement of information and activating AND circuit 36 for triggering monopulser 14. In this manner a marker domain is provided as described hereinbefore. A differentiator (not shown) between the reset output of flip-flop FF3 and AND circuit 36 insures that the latter be enabled only when the former is switched from a set to a reset condition.

Flip-flop FF1 is set in response to the opening of dial switch S4, via OR circuit 38, thus initiating the forward movement of stored information seven positions under the control of stepping switch 47. Specifically, the set output of flip-flop FF2 is connected to an input of AND circuit 56, and flip-flop FF2 is set during a write operation. The output conductor 50 of stepping switch 47 is also connected to an input of AND circuit 56. Thus, each time stepping switch 47 signals seven-gate converter 48 for a parallel output during a write operation, AND circuit 56 is activated. Note, AND circuits 51 and 52 are disabled during a write operation and no output occurs. The output of AND circuit 56 is connected to an input of OR circuit 55. Thus OR circuit 55 is activated in this instance also. The output of OR circuit 55 is connected to the reset input of flip-flop FF1. Thus, information moves forward seven positions and stops. Operation repeats for each digit dialed (except for the provision of the marker domain).

After the desired number is stored, switch S1 is closed by the subscriber. The reset input of flip-flop FF2 and an input to OR circuit 38 are connected to source 30 via switch S1. Thus flip-flop FF2 is reset. Also flip-flop FF1 is set, via OR circuit 38, initiating the propagation of the information to the right as viewed (forward) until the marker domain arrives at the forward position conductor 18 for resetting flip-flop FF1 via OR circuit 55 as described hereinbefore. The reset input of flip-flop FF4 also is connected to source 30 by means of switch S1. Thus, closure of switch S1, when the subscriber goes on-hook, resets flip-flop FF4.

The various logic circuits, drive circuits, sources, gates, and other elements described herein may be any such elements capable of operating in accordance with this invention.

Figure 6:
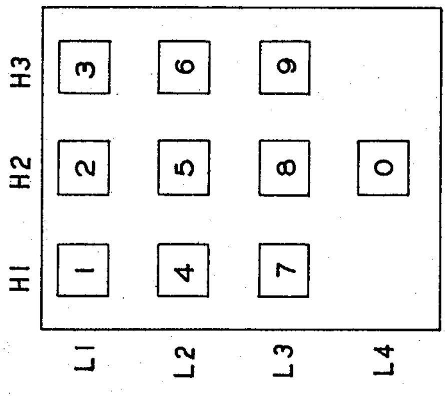
FIG. 6 is a top view of a conventional pushbutton dial.

The usual format of a pushbutton dial is shown in FIG. 6. The pushbuttons are arranged in rows of three, numbered consecutively 1 to 3, 4 to 6, and 7 to 9, designated L1, L2, and L3, respectively. A fourth row, designated L4, includes the "0" button. The columns of buttons are designated H1, H2, and H3. The zero button is in the second column. The designations L and H herein then may be seen to be the coordinates of pushbuttons in such an array. The correspondence between the button depressed by a subscriber and the L1 and H1 designations used for the input conductors and the coded reverse domain pairs herein is complete. The telephone number shown as coded reverse domain pairs (from left to right) in FIG. 5, then, corresponds to 5134440.

The subscriber records that number in a selected domain wall wire DW1 by going off-hook, by depressing the write button, and by next depressing the number-select button corresponding to the switch #1 shown in FIG. 3 before depressing the digit-select buttons 5134440 consecutively. The results of the subscriber's actions are described in connection with the pulse diagram of the write operation shown in FIG. 7. That diagram also serves as a summary of the write operation of the circuit of FIG. 1 as described hereinbefore.

Figure 7:
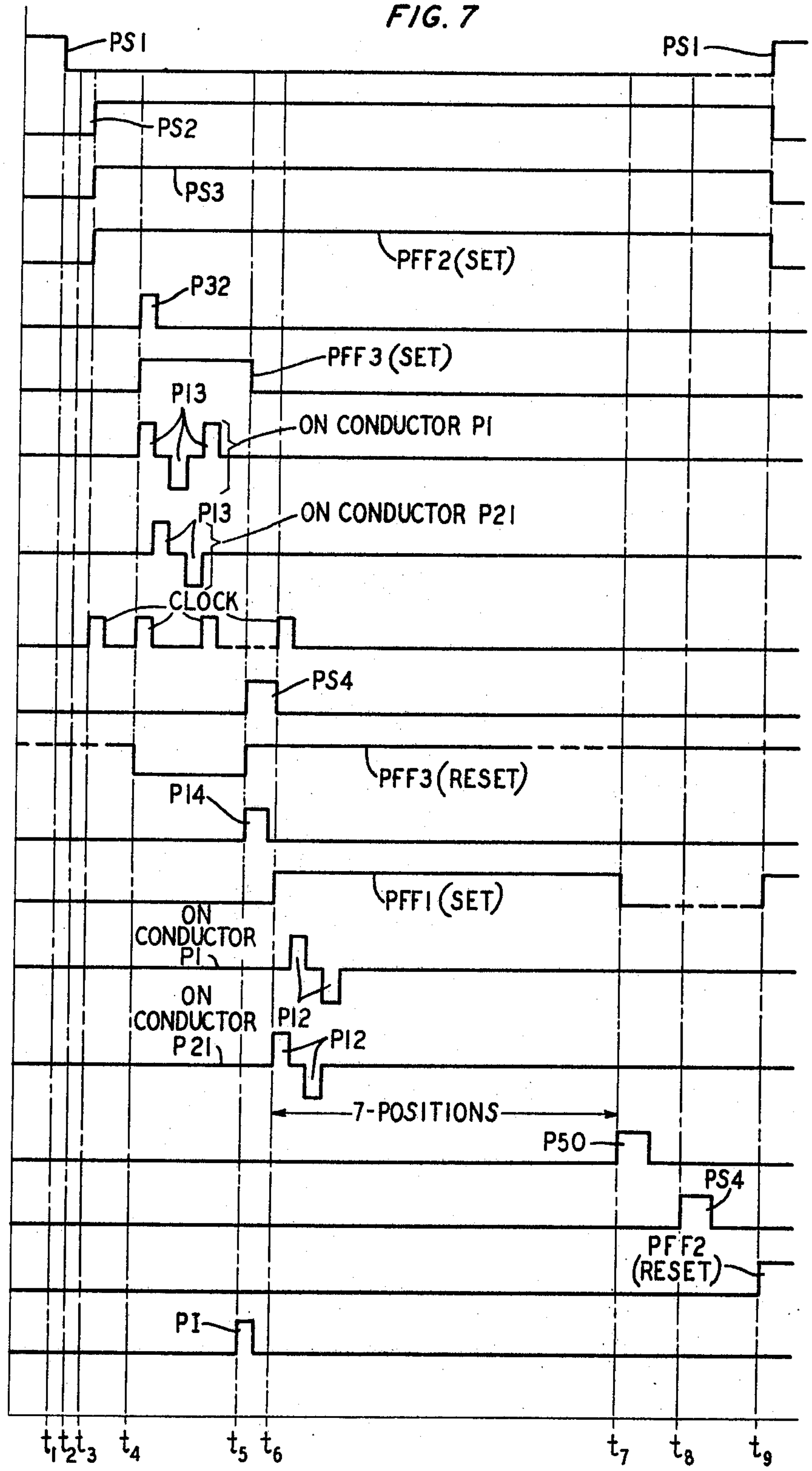
FIGS. 7 and 8 are pulse diagrams of the operation of the repertory dialer of FIG. 1.

The subscriber is assumed to go off-hook at a time $t_1$ in FIG. 7. Switch S1 is opened and the voltage level, designated PS1 in FIG. 7, supplied therethrough to OR circuit 31, to the reset input of flip-flop FF2, to the set input of flip-flop FF1, and to the reset input of flip-flop FF4 is terminated. The write button is depressed at a time $t_2$ in FIG. 7. Nothing happens until a number-select button is depressed at a time $t_3$. At time $t_3$, however, the voltage of source 30 is available through switch S2 and switch S3. The pulses PS2 and PS3 represent that voltage at switches S2 and S3, respectively. Flip-flop FF2 is set at time $t_3$ through contact B of switch S2 providing an output indicated by the pulse designated PFF2 (set). The read monopulser 32 is triggered, also at time $t_3$, through switch S3. In response, read monopulser provides a pulse (pretimed) at a time designated $t_4$ in FIG. 7 and flip-flop FF3 is set thereby providing an output designated PFF3 (set) in FIG. 7. For simplicity it is assumed that a clock pulse from clock pulse source 34 is present at time $t_4$. Thus, source 13 is triggered and responds by providing a four-phase propagation pulse sequence to conductors P1 and P21 as indicated in FIG. 7. That pulse advances reverse domains one position to the left as viewed in FIG. 1. Each additional clock pulse similarly triggers source 13 as long as flip-flop FF3 is set. A domain wall wire in accordance with this invention is about thirty-four digits long, one digit for initial storage, sixteen between conductors 19 and 15, sixteen between conductor 18 as shown in FIG. 1. Each digit encompasses seven bit positions along the wire and each bit position corresponds to four propagation pulses or one propagation pulse sequence. Thus to clear a domain wall wire of information at most 952 propagation pulses (238 pulse sequences) need be provided. Source 13 (and source 12 as well) operates conveniently at about a fifty kilocycle rate insuring that a selected wire is cleared of information before a subscriber could next depress a digit-select button. Note that amplifiers 40 and 17 are inhibited by the voltage from source 30 applied through OR circuit 31 and contact A of switch 32 during a write operation.

When the first digit-select button is depressed, the dial switch S4 of FIG. 1 is closed, resetting flip-flop FF3 and terminating movement of information to the left as viewed. The pulse PS4 delivered through switch S4 is shown at a time $t_5$ in FIG. 7. The leading edge of that pulse resets flip-flop FF3 (via differentiator 37). The change in the reset output of flip-flop FF3 triggers monopulser 14 for providing an output P14 generating a marker domain as described hereinbefore. The trailing edge of pulse PS4 is shown at a time $t_6$ in FIG. 7. That trailing edge sets flip-flop FF1 as indicated by the pulse designated PFF1 (set) in FIG. 7. Consequently, clock pulses from clock source 34 are gated to source 12 for triggering forward propagation pulse sequences. Information now moves to the right as viewed in response to the pulses P12 applied by source 12 to conductors P1 and P21 as indicated in FIG. 7.

The set output of flip-flop FF2 enables AND circuit 56 and resets stepping switch 47 via OR circuit 46A. Stepping switch 47 advances in a manner to correspond to the output of forward propagation pulse source 12 (via delay 49) providing an output (readout) signal P50 at a time $t_7$ in FIG. 7. The signal P50 triggers AND circuit 56 resetting flip-flop FF1 terminating the movement of information.

A next digit-select button is depressed at time $t_8$ in FIG. 7 providing a pulse PS4 repeating the operation initiated in response to the previous pulse PS4 at time $t_5$. Each digit-select button, 5134440, when depressed consecutively by the subscriber, stores a corresponding domain pair as shown in FIG. 5 and initiates the seven position advance as described.

The subscriber then goes on-hook. Switch S1 thus is closed resetting flip-flop FF2 and setting flip-flop FF1 via OR circuit 38 for activating forward pulse source 12. Information is thus advanced to the right until the marker domain arrives at the forward position conductor 18. This operation is shown at time $t_9$ of FIG. 7. The pulse PFF2 (reset) also enables AND circuits 51 and 52. Nothing happens, however, in the absence of an output signal (P50) from stepping switch 47. The write switch S2 and the number-select switch S3 may be opened by means not shown when switch S1 is closed. The telephone number 5134440 is now stored in wire DW1 between conductors 15 and 18.

It is clear that the subscriber may go on-hook before a complete number is stored. Such an action resets flip-flop FF2 and initiates movement to the right of all information in the wire, an operation to be completed before a next number-select button is depressed. That movement ceases when the marker domain arrives at the forward position conductor 18 as described hereinbefore.

The read operation for the automatic dialing of the illustrative telephone number 5134440 stored in domain wall wire DW1 is described in connection with the pulse diagram of FIG. 8 which also serves as a summary of the aforedescribed read operation.

Specifically, as was stated hereinbefore, the subscriber automatically "dials" the number stored in domain wall wire DW1 by going off-hook and by pressing the number-select button corresponding to switch #1 in FIG. 3. In response, switch S1 opens and switch S3 closes. Thus flip-flop FF3 is set and backward pulse source 13 steps the information, shown in FIG. 5, to the left through wire DW1. When the domain DH2 farthest to the left as viewed in FIG. 5 arrives at the backward position conductor 19, it induces a pulse P19 therein for resetting flip-flop FF3 and thus terminating the backward movement.

Figure 8:
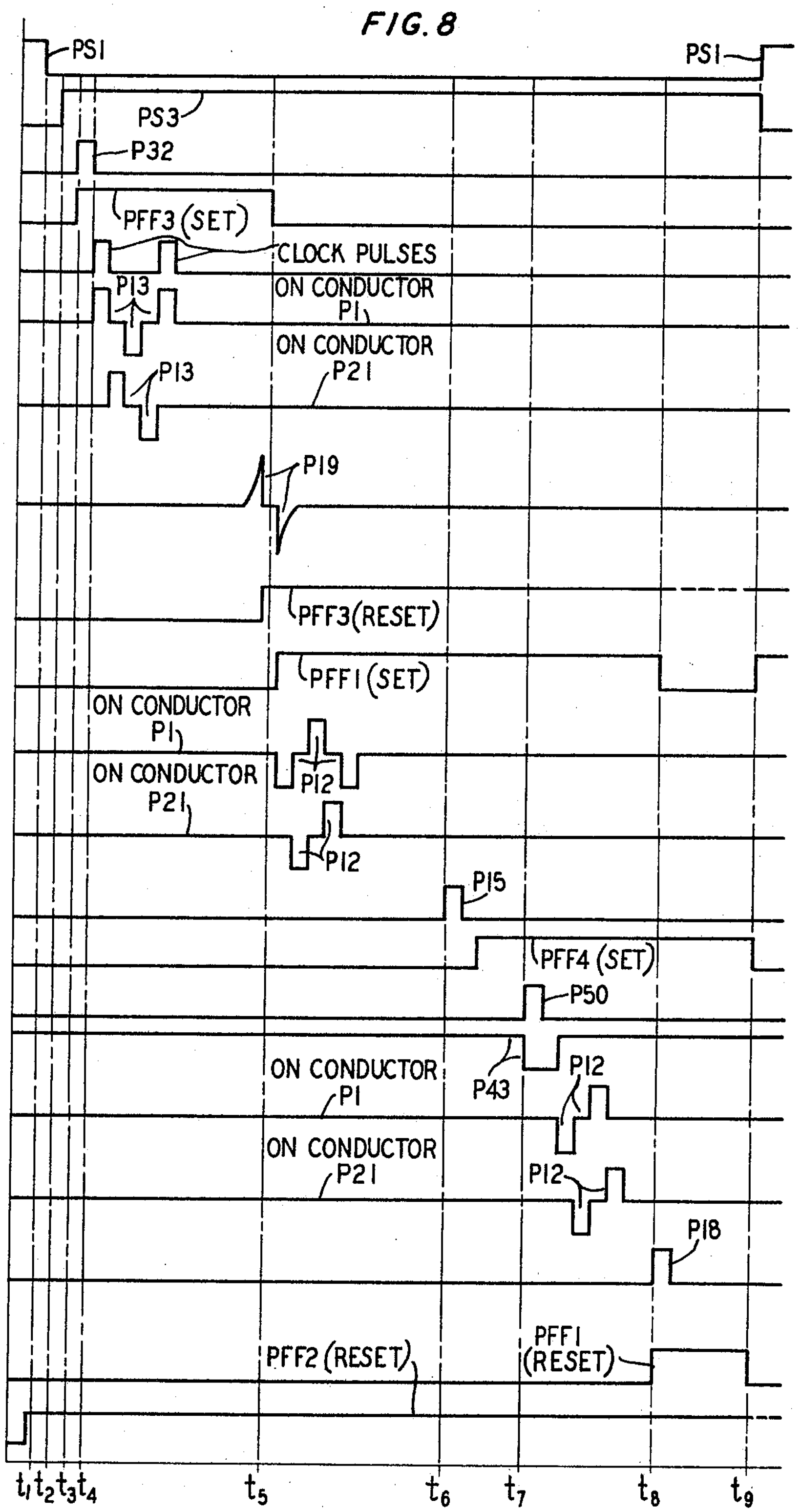

Switch S1 is shown opened at time $t_1$ as indicated by the pulse PS1 in FIG. 8. Switch S3 is shown closed at a later time $t_2$ in FIG. 8 as indicated by the pulse PS3 there. The pulse PS3 triggers read monopulser 32 which provides a delayed pulse for setting flip-flop FF3. The pulse provided by flip-flop FF3 is designated PFF3 and is shown initiated at time $t_3$. A next clock pulse from source 34 is gated by AND circuit 33 to activate backward propagation pulse source 13. Pulse source 13 in turn provides propagation pulses P13 on conductors P1 and P21 as indicated in FIG. 8. The "pulse" P19 induced by domain DH2 at time $t_5$ in FIG. 8 is bipolar. That pulse, in addition to resetting flip-flop FF3 (one polarity) as indicated by the pulse PFF3 (reset) in FIG. 8, sets flip-flop FF1 (other polarity) for initiating pulses P12 in conductors P1 and P21 for moving information to the right in wire DW1. This is indicated by the pulse PFF1 (set) at time $t_5$.

Information advances until the marker domain shown to the right in FIG. 5 arrives at sense conductor 15 of FIG. 1. That domain induces a pulse P15 in conductor 15 at a time $t_6$ for setting (on the fourth phase thereafter) flip-flop FF4, as indicated by pulse PFF4 in FIG. 7, and for setting stepping switch 47 and converter 48. Stepping switch 47 steps through its seven stages activating the corresponding gates of converter 48. When a domain of a coded domain pair passes sense conductor 15, the corresponding gate position of converter 48 includes a binary one. When a domain is absent, the corresponding output gate includes a zero. The converter 48 includes the representation 0100010 representing the first digit in FIG. 5.

Stepping switch 47 now provides a signal for gating a parallel output from converter 48 to utilization circuit 54. Flip-flop FF2 is in the reset condition during the read operation providing an output PFF2 (reset) for enabling AND circuits 51 and 52 to this end. The output from stepping switch 47 is indicated as a signal P50 at time $t_7$ in FIG. 8. That signal, then, not only activates AND circuit 51 for gating output 48, but also activates AND circuit 52. When AND circuit 52 is activated, interdigit spacing circuit 43 is deactivated providing a null at time $t_7$ for disabling AND circuit 39. The output of interdigit spacing circuit 43 is indicated as P43 in FIG. 8. The null may be for a predetermined duration deactivating pulse source 12.

When the interdigit spacing circuit again activates pulse source 12, pulses P12 are again initiated (in response to clock pulses), seven-stage stepping switch 47 is in a reset condition and converter 48 is set to the first gate. The operation repeats and 1000100 is stored in converter 48. That parallel output is again gated to utilization circuit 54 in response to the signal from stepping switch 47. That signal again drives spacing circuit 43 to a null output and the procedure repeats.

Consecutive outputs of 1000001, 0100100, 0100100, 0100100, and 0001010 are provided for the digits 3, 4, 5, 6, and 7 as shown in FIG. 5. The read operation continues thereafter to so advance information in sets of seven positions until the equivalent of sixteen digits is read out. Since only seven digits were stored, illustratively, nothing (all zeros) appears for the eighth through the sixteenth digit positions. At that time designated $t_8$ in FIG. 8, the marker domain arrives at the forward position conductor 18. The pulse P18 induced therein resets flip-flop FF1 as indicated by the pulse PFF1 (reset) in FIG. 8 terminating the forward advance of information.

When the subscriber later goes on-hook, at a time $t_9$ in FIG. 8, the number-read switch S3 may be opened (by mechanical means not shown), flip-flop FF1 is set, flip-flop FF2 is reset (it is already reset), and flip-flop FF4 is reset. When FF1 is set, in this instance, information starts to move to the right until a next domain DL2 to the right in FIG. 5 arrives at conductor 18 to repeat the operation in response to pulse P18 at time $t_8$ in FIG. 8. To avoid loss of information the domain wall wires extend beyond the position coupled by conductor 18 a length sufficient to store the representation of a digit. For an illustrative two-out-of-seven code as shown, only four additional positions are required to store the marker domain and the maximum of three zeros before a next reverse domain passes conductor 18.

A few liberties were taken in the representation of the various circuits herein. For example, the conductors P1 and P2k as shown in FIG. 3 actually overlap. They are shown there as having reduced widths only for clarity. For reference, the length of a representative bit position and the portion of that bit position occupied by a reverse domain are also indicated in FIG. 3 by the bounded arrows directed to the right. The fields generated in response to a propagation pulse sequence are well known in the art and are not discussed herein. In addition, the widths of the propagation conductors, particularly as shown in FIG. 2, correspond to the length of an arrow representing a reverse domain. In practice, the width of those conductors typically corresponds to one-half the length of a reverse domain (one phase of a four-phase propagation sequence). The width of the seven input conductors, on the other hand, is two phases (the third and fourth phases). The conductors 15 and 18 are one phase wide and are positioned to correspond to the fourth phase.

It is convenient for a subscriber subset compatible in accordance with this invention to include lock-out means to avoid depressing two number-select buttons to avoid parallel operation thereof. Such parallel operation may lead to a diminution of propagation currents to a level at which some domains may propagate and others may not. This operation is to be avoided.

It is clear that storage locations are accessed herein by a number-select button. Yet the information in the locations is "selected" by a propagation mechanism essentially independent of the number-select operation. Thus, access noise is not reflected in the sequential output of a circuit via sense conductor 15 in accordance with this invention. Moreover, the output as shown in FIG. 1 includes a comon sense conductor 15 and a single amplifier 17. Two additional amplifiers (20 and 40) are shown in FIG. 1. The number of amplifiers, then, in accordance with this invention is fewer than the number (one per bit) normally required for word-organized memories.

It is to be understood that what has been described is merely illustrative of this invention and that numerous other arrangements in accordance with the principles of this invention may be devised by one skilled in the art without departing from the spirit and scope thereof.

What is claimed is:

1. In combination, a plurality of domain wall wires, sense means coupled to an intermediate position of said wires for defining first and second portions in each of said wires, write means for storing a like pattern of reverse domains in said first portions of said plurality of wires, means for advancing said pattern of reverse domains to the second portion of a selected one of said plurality of wires, and means responsive to a read signal for returning said pattern of reverse domains from said second to said first portion, said last mentioned means being operative to clear reverse domains from said first portion of said selected wire.

2. In a repertory dialer, a plurality of domain wall wires, sensing means coupled to an intermediate position of each of said wires for defining write and storage portions in said wires, write means responsive to consecutive coded $m$-out-of-$n$ input signals for providing corresponding consecutive coded reverse domains in said input portion of each of said wires, means responsive to each code of said coded $m$-out-of-$n$ input signals for advancing said coded reverse domains in a selected one of said wires $n$ positions in a first direction toward said storage portion there, means responsive to an end-of-write signal for advancing reverse domains to the storage portion of said selected wire, means responsive to a read signal for returning said coded reverse domains in said selected one of said wires to said write portion and thereafter advancing said domains to said storage portion of said selected wire, said sensing means being responsive to the passage of a reverse domain thereby from said write to said storage portion of said selected wire for providing an output therein.

3. A combination comprising a plurality of domain propagation media, sense means coupled to an intermediate position of each of said media for dividing each into first and second portions, write means for storing simultaneously a like pattern of reverse domains in said first portion in each of said media, means for advancing said pattern of reverse domains to the second portion in only a selected one of said media, signal responsive means for returning said pattern of domains from a second to a first portion in a selected one of said media, said last-mentioned means being operative to clear reverse domains from said first portion.

4. A combination in accordance with claim 3 wherein said magnetic media comprise a plurality of magnetic domain wall wires, and wherein said write means is coupled to said first portion of each of said wires and responsive to each code of coded $m$-out-of-$n$ input signals for providing a coded reverse domain pair in the corresponding $m$-out-of-$n$ positions of said first portion of each of said wires simultaneously.

5. A combination in accordance with claim 4 including means responsive to each code of said $m$-out-of-$n$ input signals for storing a marker domain in the $n+1$th position of said write portion simultaneously with the storage of a first of a sequence of coded reverse domain pairs.

6. A combination in accordance with claim 5 including means responsive to a write signal for clearing reverse domains from a selected one of said wires.

7. A combination in accordance with claim 6 including first control means responsive to each code of said coded $m$-out-of-$n$ input signals for advancing reverse domains a prescribed number of positions in a first direction through a selected wire.

8. A combination in accordance with claim 7 including second control means for limiting the advance of reverse domains in a first direction in said selected wire.

9. A combination in accordance with claim 4 including means responsive to a read signal for moving reverse domains in a second direction, then in a first direction past said common sense means for inducing output signals therein.

10. A combination in accordance with claim 9 including means for inhibiting the advance of said domains in a first direction for a prescribed time.

11. A combination in accordance with claim 10 including third control means responsive to a read signal for limiting the advance of reverse domains in a second direction in said selected wire.

12. A combination in accordance with claim 10 including stepping means responsive to the passage of reverse domains in a first direction past said sensing means for storing a parallel representation of the corresponding reverse domain pair, and means responsive to said stepping means for providing an output indicative of that parallel representation.

References Cited

UNITED STATES PATENTS

| | | | |
|---|---|---|---|
| 3,241,127 | 3/1966 | Snyder | 340—174 |
| 3,387,290 | 6/1968 | Snyder | 340—174 |
| 3,248,716 | 4/1966 | Snyder | 340—174 |

BERNARD KONICK, Primary Examiner

GARY M. HOFFMAN, Assistant Examiner

U.S. Cl. X.R.

179—90